United States Patent
Chikiri et al.

[11] Patent Number: 5,670,208
[45] Date of Patent: Sep. 23, 1997

[54] PC STAND COATED WITH RUST INHIBITOR AND METHOD THEREOF

[75] Inventors: Kazuyoshi Chikiri, Fukuchiyama; Yukihiro Higashi, Sakai, both of Japan

[73] Assignees: Hien Electric Industries, Osaka; Times Eng., Ltd., Tokyo, both of Japan

[21] Appl. No.: 354,263

[22] Filed: Dec. 12, 1994

Related U.S. Application Data

[63] Continuation of Ser. No. 44,028, Apr. 8, 1993, abandoned.

[30] Foreign Application Priority Data

Feb. 3, 1993 [JP] Japan .................................. 5-037331

[51] Int. Cl.$^6$ .................................. B05D 3/12; D01D 5/00
[52] U.S. Cl. .................................. 427/177; 427/536; 427/538; 427/434.6; 427/388; 264/174; 156/51; 156/244.11; 425/113; 425/516
[58] Field of Search .................................. 427/177, 388.1, 427/434.6, 434.7, 536, 538, 539; 264/174; 156/51, 244.11, 244.12; 425/113, 516

[56] References Cited

U.S. PATENT DOCUMENTS

| | | | |
|---|---|---|---|
| 2,384,228 | 11/1945 | Williams | 264/174 |
| 2,708,771 | 5/1955 | Stoneback . | |
| 3,041,673 | 7/1962 | Goodwine . | |
| 3,172,931 | 3/1965 | Peterson | 264/174 |
| 3,911,069 | 10/1975 | Fujita et al. . | |
| 3,960,629 | 6/1976 | Goldsworthy | 156/244.12 |
| 4,017,579 | 4/1977 | Roe et al. . | |
| 4,057,956 | 11/1977 | Tolle . | |
| 4,080,131 | 3/1978 | Bahder et al. . | |
| 4,131,759 | 12/1978 | Felkel | 264/174 |
| 4,309,597 | 1/1982 | Crowley | 264/174 |
| 4,341,509 | 7/1982 | Harlow | 264/174 |
| 4,623,504 | 11/1986 | Smith | 264/174 |
| 4,701,575 | 10/1987 | Gupta et al. | 156/51 |
| 4,986,372 | 1/1991 | Ganssle | 156/51 |
| 5,043,538 | 8/1991 | Hughey, Jr. et al. | 156/51 |
| 5,113,039 | 5/1992 | Guipe et al. | 156/51 |
| 5,391,685 | 2/1995 | Hitomi et al. | 528/75 |

FOREIGN PATENT DOCUMENTS

| | | |
|---|---|---|
| 0409011 | 1/1991 | European Pat. Off. . |
| 2216098 | 8/1974 | France . |

OTHER PUBLICATIONS

Patent Abstracts of Japan, vol. 14, No. 188 (C–710) 17 Apr. 1990 of JP–A–02 033 387 (Kurosawa Kensetsu K.K.) 2 Feb. 1990.

Patent Abstracts of Japan, vol. 14, No. 355 (M–1004) 31 Jul. 1990 of JP–A–02 125 704 (Tatsua El. Wire & Cable Co. Ltd.) 14 May 1990.

*Primary Examiner*—Shrive Beck
*Assistant Examiner*—Brian K. Talbot
*Attorney, Agent, or Firm*—Armstrong, Westerman, Hattori, McLeland, & Naughton

[57] ABSTRACT

A PC strand is coated with rust inhibitive material of thermoplastic resin so as to wholly close spaces left around a core and peripheral wires twisted around the core, thus preventing the core and wires from rusting. The strand coated with the rust inhibitive material can be produced without being untwisted by use of an extruding machine having an auxiliary pressure head connected to a cross head.

5 Claims, 4 Drawing Sheets

PC STAND COATED WITH RUST INHIBITOR AND METHOD THEREOF

This application is a continuation of application Ser. No. 08/044,028 filed Apr. 8, 1993, now abandoned.

BACKGROUND OF THE INVENTION

1. Field of the Invention

This invention relates to a precast strand and a method thereof, which is used for straining prestressed concrete and coated with rust inhibitive material.

2. Description of the Prior Art

Prestressed concrete (PS concrete) has been so far obtained by the unbonding method in which, upon inserting a precast strand wire (PC strand) into a synthetic resin tube which is generally called "sheath", rust inhibitive material is poured in the sheath to close the space between the inner wall of the sheath and the PC strand with the rust inhibitive material, thus obtaining an unbonded cable, and then, the unbonded cable is placed in concrete in its strained state. Besides, there is a post-tension bonding method in which upon inserting a PC strand into a steel sheath placed in concrete in its strained state, the sheath is filled with graft material such as cement milk to integrate the PC strand with the concrete. Furthermore, in a pretension bonding method without using a sheath, a PC strand strained in advance is placed in concrete, and after the concrete is set, both end portions of the strand bound with the concrete are cut off.

The PS concrete making methods as mentioned above other than the unbonding method utilizing the rust inhibitive material have entailed a disadvantage such that water contained in the concrete comes in touch with the PC strand since the concrete and the strand are in direct contact with each other.

Also in the unbonding method, the water contained in the concrete will touch the PC strand when the sheath is broken. Thus, this unbonding method cannot be expected to have a function of fully preventing the PC strand from rusting.

In recent years, a PC strand coated with synthetic resin having a bonding property and inserted into a synthetic resin sheath together with a lubricant layer has been developed and applied to the post-tension unbonding method. In another pretension unbonding method, a PC strand coated with synthetic resin and strained has been attempted to be placed directly in concrete.

However, even if the PC strands applied to these methods are coated with synthetic resin as illustrated in FIG. 4, spaces c are left around a core a and peripheral wires b1 . . . b6 which constitute the PC strand. As a result, water or air possibly infiltrates the PC strand from the ends thereof through the spaces c, thus rusting the PC strand.

To eliminate such disadvantages suffered by the conventional PC strands described above, Japanese Patent Application Public Disclosure HEI 3-28444 and Japanese Patent Publication HEI 3-1436 each disclose a method in which, after untwisting and spreading the end portion of the PC strand to assume the disentangle state of the strand, the spaces in the end portion of the PC strand are closed by being impregnated with synthetic resin or coated with powdered paint.

The PC strand is generally produced by heating the twisted wires at about 400° C., and then, removing residual stress in the twisted wires (blueing treatment) to stabilize the twisted state of the PC strand. However, the blueing suffers a disadvantage such that it causes the PC strand to generate internal strain (residual stress), thus impeding the stability of the twisted wires.

On the other hand, the pretension unbonding method possesses the drawback of insufficient bonding strength between the PC strand and the concrete. To remedy this drawback, Japanese Patent Application Public Disclosure SHO 59-130960 proposes a method of using sand-like particles to be crammed in the surface portion of a coating layer in order to strengthen the bonding of the PC strand and the concrete. However, this proposed method could not yet been put to practical use. Therefore, the existing pretension unbonding method has generally adopted the PC strand which does not undergo rust-preventing treatment.

OBJECT OF THE INVENTION

In the light of the foregoing, the present invention has a primary object to provide a precast strand in which spaces formed around a core and peripheral wires are wholly closed with rust inhibitive material without untwisting the strand and the outermost surfaces of the peripheral wires are coated with the rust inhibitive material, and a method for producing the precast strand.

Another object of this invention is to provide a precast strand coated with rust inhibitive material and having good bonding property to concrete, and a method for producing the precast strand.

SUMMARY OF THE INVENTION

To attain the objects described above according to this invention, there is provided a precast strand into which a plurality of peripheral wires are twisted about a core, which strand is coated with rust inhibitive material of thermoplastic resin and subjected to press forming while being heated, so as to form rust inhibitive layers being in close contact with the core and peripheral wires. A method of producing a precast strand entirely coated with rust inhibitive material according to this invention comprises twisting a plurality of peripheral wires about a core to form a strand, introducing the strand into an extruding machine while heating the strand, and extruding rust inhibitive material of thermoplastic resin from a molding die disposed on a leading end of an auxiliary pressure head connected to a cross head of the extruding machine while melting the rust inhibitive material with heat, so as to form rust inhibitive layers being in close contact with the core and peripheral wires.

According to this invention, the spaces defined around the core and peripheral wires can be wholly closed with the rust inhibitive material with which the precast strand is coated under pressure.

The core around which six peripheral wires are twisted to form the strand is made larger in diameter than the peripheral wire by at least 0.03 nun to 0.08 mm. Since the small spaces defined between the core and the peripheral wires can be wholly closed with the rust inhibitive material, the core and peripheral wires can be entirely prevented from rusting, but there is no necessity for untwisting the strand.

In order to elevate the bonding property of the strand to concrete, as occasion demands, the strand may be subjected to corona discharge treatment so as to make the outer surface of the strand moderately coarse.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The other objects and features of the present invention will be hereinafter explained in detail with reference to the accompanying drawings, wherein.

DESCRIPTION OF THE PREFERRED EMBODIMENT

Figure 1:
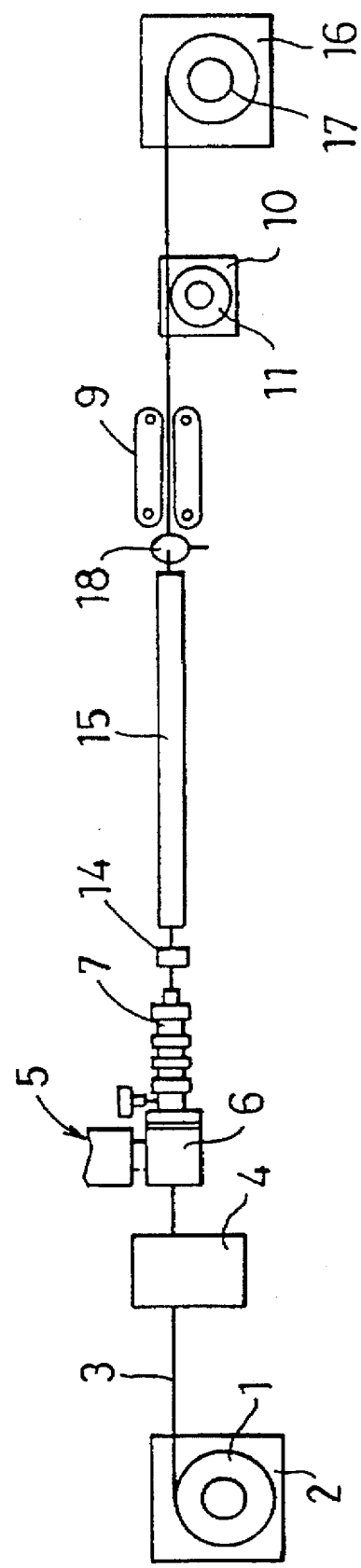
FIG. 1 is a schematic side view showing one embodiment of an extruding machine for producing a precast strand according to this invention.

One preferable embodiment of this invention will be disclosed in detail hereinafter.

First of all, a PC strand coil 1 is placed in position on a supply device 2 to continuously supply an untreated PC strand 3. The untreated PC strand 3 in this embodiment is formed by twisting six peripheral wires b1 ... b6 around a core a, as shown in the sectional view of FIG. 4.

The untreated PC strand 3 in this invention is introduced into an extrusion forming machine 5 through a heating device 4. The temperature at which the untreated PC strand is heated by the heating device is maintained at about 200° C.

Figure 2:
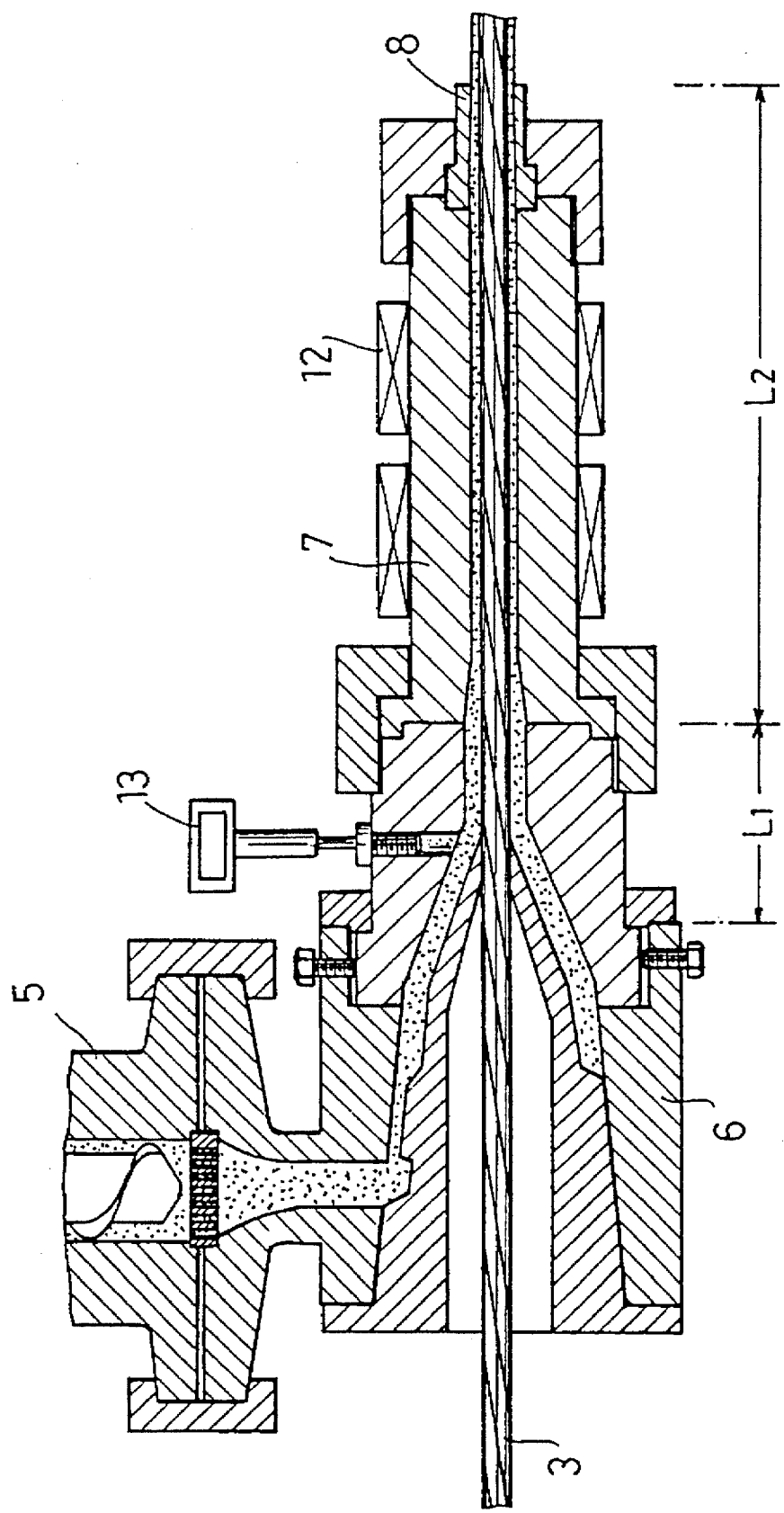
FIG. 2 is an enlarged side view in section of the cross head of the extruding machine of FIG. 1.
Figure 3:
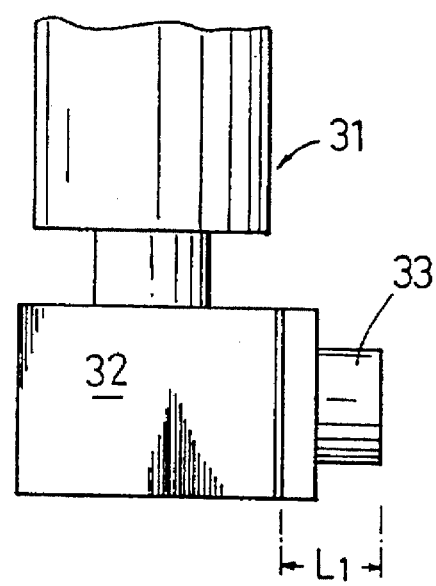
FIG. 3 is an enlarged side view in section of the cross head of a conventional extruding machine.

In general, a conventional extruder 31 comprises a cross head 32 and a molding die 33 having a small length L1 and attached to the cross head, as shown in FIG. 3. On the other hand, an extruder 5 used in the present invention comprises a cross head 6, an auxiliary pressure head 7 connected to the cross head, and a molding die 8 attached to the leading end of the auxiliary pressure head. Since the molding die is attached to the leading end of the auxiliary pressure head, the entire length of the machine is longer than that of the conventional machine by L2, as shown in FIG. 2.

The untreated PC strand 3 passed beyond the heating device 4 is fed to the molding die 8 through the cross head 6 and the auxiliary pressure head 7 of the extruder 5. Then, the untreated PC strand 3 is joined to a guide wire (not shown). The guide wire is drawn by a drawing device g and wound round a guide wire reel 11 in a guide wire winding device 10.

On the other hand, rust inhibitive material of thermoplastic resin used in this invention is heated to melt at about 200° C. by the extruder 5, and attached closely to the entire surfaces of the core a and peripheral wires b1 ... b6 of the PC strand 3 which had been fed through the cross head 6 and auxiliary pressure head 7 and passed through the molding die 8, so as to form a coating layer d with which spaces c ... c formed around the core and peripheral wires are wholly closed.

As the thermoplastic resin in this invention, polyethylene, polypropylene, a copolymer or modified resin of polyethylene and polypropylene, or other synthetic resin such as nylon may be used.

The auxiliary pressure head 7 of the cross head 6 used in this invention can be heated by a heater 12 so as to thoroughly impregnate the PC strand with the molten thermoplastic resin. However, when an amorphous polymer having small molecular weight is used as the thermoplastic resin, it is not necessarily heated.

The rust inhibitive material of the thermoplastic resin is extruded from the molding die 8 disposed on the leading end of the auxiliary pressure head 7, so as to envelop the untreated PC strand 3 with the rust inhibitive material. Since the molding die 8 has a small aperture of a prescribed size through which the PC strand passes, the internal resin pressure in the auxiliary pressure head 7 is increased more than the resin pressure generated in the conventional device. That is to said, the resin pressure in the conventional cross head 32 as shown in FIG. 3 is 40 to 50 kgf/cm$^2$ under which the spaces c ... c formed in the PC strand cannot be closed. However, the internal resin pressure in the auxiliary pressure head 7 in this invention comes to 100 kgf/cm$^2$ or more. Under the remarkably high pressure, the spaces c ... c in the PC strand can be completely closed with the synthetic resin. The resin pressure can be regulated by use of a pressure gauge 13.

The length L2 of the auxiliary pressure head 7 in this invention is longer than the length L1 of the molding die in the conventional machine. When using an amorphous polymer as the rust inhibitive material, the length of the auxiliary pressure head may be over twice the length L1. However, when using other thermoplastic resin, the auxiliary pressure head is preferably three or more times as long as the length L1. When the length of the auxiliary pressure head is over five times the length L1, it is desirable to further narrow down the PC strand by use of an auxiliary molding die 14. This is because when the length of the auxiliary pressure head is over five times the length L1, the coating layer will possibly swell due to excess pressure caused by passing the PC strand through the single molding die 8, consequently to fail to keep the desired thickness of the coating layer.

The PC strand 3 coated with the rust inhibitive material of thermoplastic resin is extruded out of the molding die 8 or the auxiliary molding die 14 as required, and then, introduced into a cooling device 15 to be cooled and wound around a reel 17 in a strand winding device 16.

In a case that the PC strand thus obtained is required to be strongly bonded to concrete, the PC strand may be fed through a corona discharging device 18 after passing through the cooling device 15, so as to make the outer surface of the PC strand moderately coarse.

Figure 4:
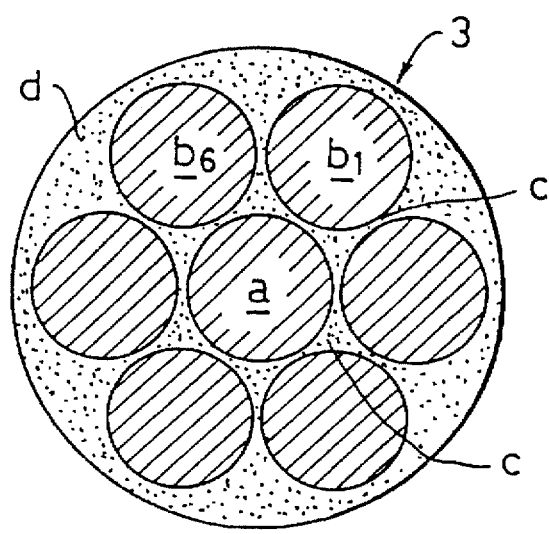
FIG. 4 is a sectional view of the precast strand coated with rust inhibitive material according to this invention.

The PC strand 3 finally obtained in the manner as described above has the twisted core a and peripheral wires b1 ... b6 entirely coated tightly with the rust inhibitive layer d as shown in FIG. 4.

Figure 5:
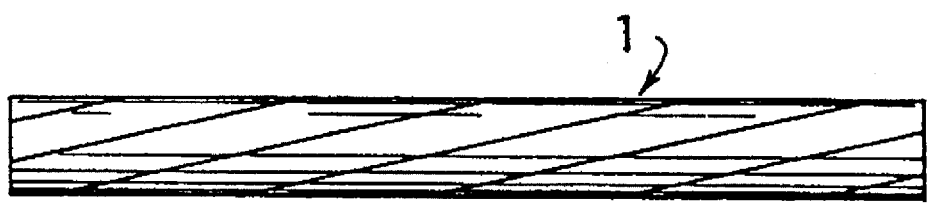
FIG. 5 is a side view of a first specimen used in a test.
Figure 6:
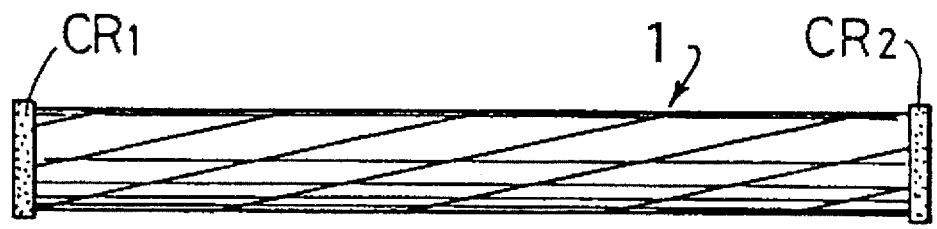
FIG. 6 is a side view of a second specimen used in the test.

A test for comparing the PC strand coated with the rust inhibitive material according to this invention with a conventional PC strand in which only the outer surface is coated with rust inhibitive material was performed. A first specimen #1 used in this test was prepared by twisting seven SWPRB wires into a PC strand of 12.7 mm in diameter and 200 mm in length, coating the PC strand thus obtained with a polyethylene layer of 200 μm in thickness, and cutting both ends of the strand with a cutter as shown in FIG. 5. A second specimen #2 was prepared by further closing both ends of the specimen #1 with synthetic resins CR1 and CR2 and boring the central portion of the specimen to form a hole of 3 mm in width and 50 mm in length. The test was carried out in a manner of stripping the coating layers off from the respective specimens after immersing both the specimens in salt water for 2000 hours, untwisting the specimens to separate the wires one by one, allowing the specimens to stand after cleansing the separated wires, and visually observing appearance of rust.

The following result of the test was obtained.

| SPECIMEN #1 | Strand of this invention | No rust appeared except both ends. |
|---|---|---|
| | Comparative strand | Rust appeared on the whole due to infiltration of salt water. |
| SPECIMEN #2 | Strand of this invention | No rust appeared except the hole. |
| | Comparative strand | Rust appeared on the whole due to infiltration of salt water. |

According to the method of the present invention, the PC strand having the core and peripheral wires wholly coated closely with rust inhibitive material and being subjected to blueing treatment without untwisting the stably twisted strand can be obtained. Thus, the PC strand obtained according to this invention can be completely prevented from rusting. Besides, the PC strand of this invention is provided with an outer surface having good bonding property to concrete. The method of completely coating the PC strand with the rust inhibitive material can easily be practiced continuously and economically.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A method of producing a precast strand entirely coated with rust inhibitive material, which comprises twisting a plurality of peripheral wires about a core to form a strand, introducing said strand into an extruding machine while heating said strand, and extruding a rust inhibitive material of thermoplastic resin from a molding die disposed on a leading end of an auxiliary pressure head connected to a cross head of said extruding machine while melting said rust inhibitive material with heat to subject said rust inhibitive material to a internal resin pressure of at least 100 kgf/cm$^2$, so as to form a rust inhibitive layer being in contact with the core and peripheral wires, wherein the cross head of the extruding machine has a length L1 and the auxiliary pressure head has a length L2, the length L2 being at least three times greater than the length L1.

2. A method of producing a precast strand entirely coated with rust inhibitive material set forth in claim 1, wherein said rust inhibitive material of thermoplastic resin is an amorphous polymer.

3. A method of producing a precast strand entirely coated with rust inhibitive material set forth in claim 1, wherein said auxiliary pressure head is provided with a heater.

4. A method of producing a precast strand entirely coated with rust inhibitive material set forth in claim 1, further including subjecting said rust inhibitive layer to corona discharge to coarsen an outer surface of said layer.

5. A method of producing a precast strand entirely coated with rust inhibiting material as set forth in claim 1, wherein the length L2 is at least five times greater than the length L1.

* * * * *